(12) United States Patent
Truxel

(10) Patent No.: US 10,968,620 B2
(45) Date of Patent: Apr. 6, 2021

(54) SANDWICH STRUCTURE WITH LATTICE HAVING HARD POINTS

(71) Applicant: Raytheon Company, Waltham, MA (US)

(72) Inventor: Andrew Truxel, Hermosa Beach, CA (US)

(73) Assignee: Raytheon Company, Waltham, MA (US)

( * ) Notice: Subject to any disclaimer, the term of this patent is extended or adjusted under 35 U.S.C. 154(b) by 98 days.

(21) Appl. No.: 16/156,181

(22) Filed: Oct. 10, 2018

(65) Prior Publication Data

US 2020/0115892 A1 Apr. 16, 2020

(51) Int. Cl.
| | |
|---|---|
| *B32B 3/10* | (2006.01) |
| *E04B 1/19* | (2006.01) |
| *B22F 7/02* | (2006.01) |
| *E04B 1/24* | (2006.01) |

(52) U.S. Cl.
CPC .............. *E04B 1/1903* (2013.01); *B22F 7/02* (2013.01); *E04B 1/2403* (2013.01); *E04B 2001/196* (2013.01); *E04B 2001/1924* (2013.01); *E04B 2001/2481* (2013.01)

(58) Field of Classification Search
None
See application file for complete search history.

(56) References Cited

U.S. PATENT DOCUMENTS

| | | | |
|---|---|---|---|
| 5,527,590 | A | 6/1996 | Priluck |
| 6,644,535 | B2 | 11/2003 | Wallach et al. |
| 7,281,809 | B2 | 10/2007 | Warren |
| 7,424,967 | B2 | 9/2008 | Ervin et al. |

(Continued)

FOREIGN PATENT DOCUMENTS

| | | |
|---|---|---|
| EP | 0 903 216 A2 | 3/1999 |
| EP | 2636592 | 9/2013 |

(Continued)

OTHER PUBLICATIONS

Pending claims of co-pending U.S. Appl. No. 16/156,166 filed Oct. 10, 2018.

(Continued)

*Primary Examiner* — Seth Dumbris
*Assistant Examiner* — Kim S. Horger
(74) *Attorney, Agent, or Firm* — Renner, Otto, Boisselle & Sklar, LLP

(57) ABSTRACT

A sandwich structure includes two face plates, with a lattice structure between the plates, and with hard points at selected locations. The face plates, and the lattice structure with its hard points, may all be made as a single continuous piece by an additive manufacturing process. The hard points may be strengthened and/or stiffened areas of the lattice that may be used for connecting fasteners, or for other purposes. The hard points may be located at the junction between the lattice and one of the faces, and may be a locally thickened portion on one of the faces, for example being a cylindrical or parallelepiped protrusion out from the face. The hard points may serve the purpose of a built-in nut plate, such as themselves containing threaded holes, or by having a threaded inserts put into holes or recesses in the hard points.

16 Claims, 4 Drawing Sheets

(56) References Cited

U.S. PATENT DOCUMENTS

| | | | |
|---|---|---|---|
| 8,137,491 | B2 | 3/2012 | Cahuzac et al. |
| 9,086,229 | B1 | 7/2015 | Roper et al. |
| 9,121,674 | B2 | 9/2015 | Wilson |
| 9,162,416 | B1* | 10/2015 | Eckel .................. B32B 3/12 |
| 2004/0144055 | A1 | 7/2004 | Lewison et al. |
| 2011/0183104 | A1 | 7/2011 | Juergens |
| 2012/0061065 | A1 | 3/2012 | LaCombe |
| 2016/0152314 | A1* | 6/2016 | Carlsten ............. B32B 37/16 244/119 |
| 2018/0003867 | A1* | 1/2018 | Mooney ................ G02B 7/183 |

FOREIGN PATENT DOCUMENTS

| | | |
|---|---|---|
| FR | 2 876 946 A1 | 4/2006 |
| WO | 93/09068 | 5/1993 |
| WO | 2008/127301 | 10/2008 |

OTHER PUBLICATIONS

Li, Zongxuan, et al. "Optimal design of a [Phi]760 mm lightweight SiC mirror and the flexural mount for a space telescope," Review of Scientific Instruments, vol. 88, No. 12, Dec. 11, 2017.

Mammini, Paul V., et al. "3D-additive manufactured optical mount," Visual Communications and Image Processing, vol. 9573, Sep. 2, 2015.

Rashed, M, G., et al, "Metallic microlattice materials: A current state of the art on manufacturing, mechanical properties and applications," Materials and Design, vol. 95, Feb. 2, 2016.

International Search Report and Written Opinion issued by WIPO in corresponding application PCT/US2019/036488 dated Sep. 25, 2019.

* cited by examiner

US 10,968,620 B2

SANDWICH STRUCTURE WITH LATTICE HAVING HARD POINTS

FIELD OF THE INVENTION

The invention is in the field of sandwich structures.

DESCRIPTION OF THE RELATED ART

Typical sandwich structures are used for high stiffness/low weight applications consisting of face sheets, core, and fastener hard points. The different materials are joined by an adhesive, which is the weakest point and labor intensive.

SUMMARY OF THE INVENTION

A sandwich structure has an internal lattice with hard points.

A sandwich structure has an additively-manufactured lattice structure that includes hard points.

According to an aspect of the invention, a sandwich structure includes: a pair of face plates; and a lattice structure between the face plates. The lattice structure includes stiffened hard points that are stiffer than surrounding regions of the lattice structure.

According to an embodiment of any paragraph(s) of this summary, the hard points are located at junctions between the lattice structure and one of the face plates.

According to an embodiment of any paragraph(s) of this summary, the lattice structure is additively manufactured as a unitary piece.

According to an embodiment of any paragraph(s) of this summary, at least one of the face plates is also additively manufactured as part of the unitary piece that includes the lattice structure.

According to an embodiment of any paragraph(s) of this summary, the lattice structure and at least one of the face plates are made of the same material.

According to an embodiment of any paragraph(s) of this summary, the lattice structure includes ribs.

According to an embodiment of any paragraph(s) of this summary, some of the ribs are stiffer than other of the ribs.

According to an embodiment of any paragraph(s) of this summary, some of the ribs are made of different material(s) than other of the ribs.

According to an embodiment of any paragraph(s) of this summary, some of the ribs are thicker than other of the ribs.

According to an embodiment of any paragraph(s) of this summary, the lattice structure includes ribs, at least some of which are hollow ribs.

According to an embodiment of any paragraph(s) of this summary, the lattice structure includes ribs angled at multiple non-perpendicular angles to major surfaces of the face plates.

According to an embodiment of any paragraph(s) of this summary, the hard points provide anchor points fasteners, to mechanically couple the sandwich structure to one or more other objects.

According to an embodiment of any paragraph(s) of this summary, the hard points function as nut plates that are configured to receive threaded fasteners.

According to an embodiment of any paragraph(s) of this summary, the hard points have holes in them, and further comprising threaded inserts in the holes.

According to an embodiment of any paragraph(s) of this summary, the hard points have integrally-formed internally-threaded holes.

According to another aspect of the invention, a method of making a sandwich structure includes the step(s) of: manufacturing a lattice structure of the sandwich structure. The lattice structure is between face plates of the sandwich structure. The lattice structure includes stiffened hard points that are stiffer than surrounding regions of the lattice structure.

According to an embodiment of any paragraph(s) of this summary, the manufacturing of the lattice structure is additive manufacturing.

According to yet another aspect of the invention, a sandwich structure includes: a pair of face plates; and a lattice structure between the face plates. The lattice structure includes stiffened hard points that are stiffer than surrounding regions of the lattice structure. The lattice structure includes ribs extending between the face plates.

According to an embodiment of any paragraph(s) of this summary, the ribs intersect with the stiffened hard points.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A sandwich structure includes two face plates, with a lattice structure between the plates, and with hard points at selected locations. The face plates, and the lattice structure with its hard points, may all be made as a single continuous piece by an additive manufacturing process. The hard points may be strengthened and/or stiffened areas of the lattice that may be used for connecting fasteners, or for other purposes.

The hard points may be located at the junction between the lattice and one of the faces, and may be a locally thickened portion on one of the faces, for example being a cylindrical or parallelepiped protrusion out from the face. The hard points may serve the purpose of a built-in nut plate, such as themselves containing threaded holes, or by having a threaded inserts put into holes or recesses in the hard points.

The lattice may have ribs that are all substantially the same. Alternatively some of the ribs may have different materials, different thicknesses, and/or different configurations than other of the ribs. Stronger and/or stiffer ribs, and/or additional ribs, may be used in areas where the lattice carries higher loads. Some or all of the ribs may be hollow.

Figure 1:
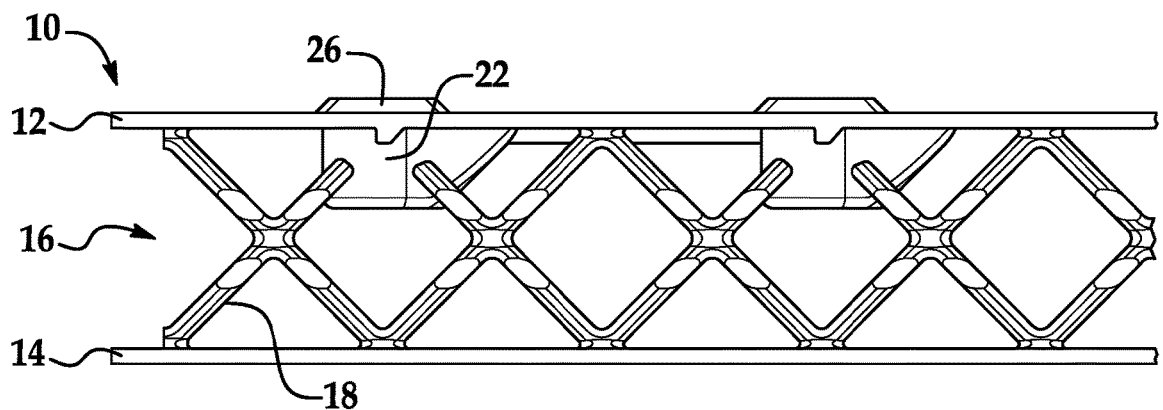
FIG. 1 is a side view of a sandwich structure according to an embodiment of the invention.
Figure 2:
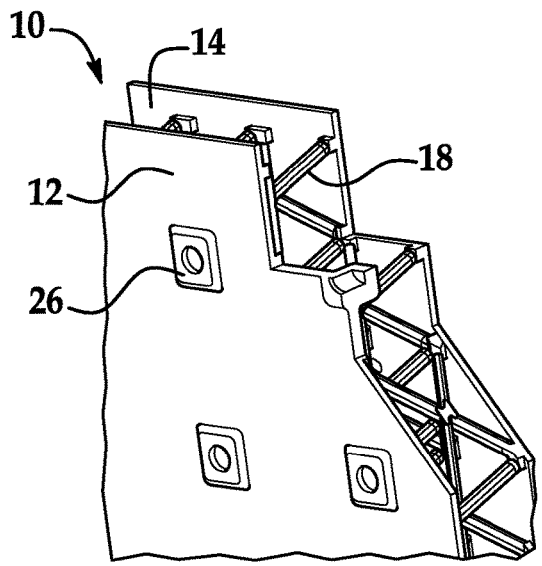
FIG. 2 is an oblique partial cutaway view of the sandwich structure of FIG. 1.
Figure 3:
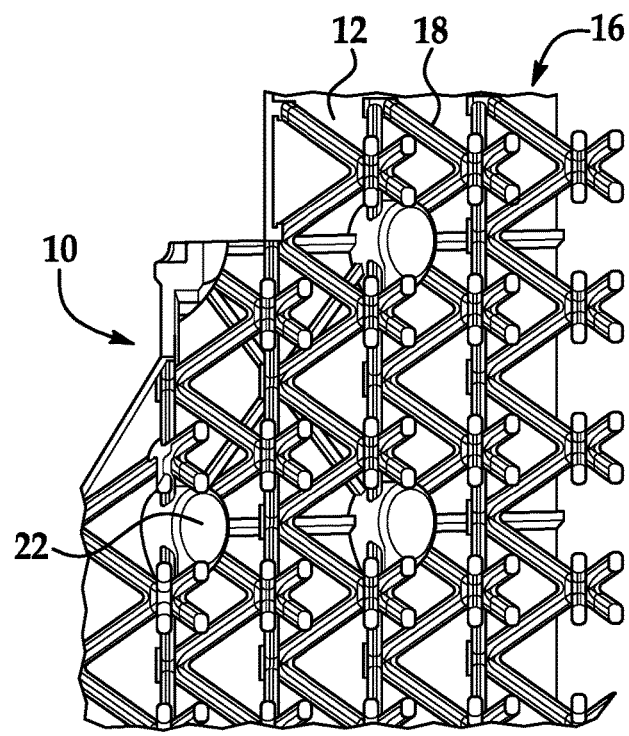
FIG. 3 is another oblique partial cutaway view of the sandwich structure of FIG. 1.

FIGS. 1-3 show a sandwich structure 10 that includes a pair of face plates 12 and 14, and a lattice structure 16 between the plates 12 and 14. The lattice structure 16 includes a series of ribs or struts 18 that are angled relative to one another, and that extend between the plates 12 and 14. The ribs 18 may intersect with one another, and may be in any of a variety of configurations. The ribs 18 of the lattice structure 16 may be considered to be a truss, providing support between the face plates 12 and 14, while still having considerable empty space between and around the ribs 18. This provides a structural member that is light weight, yet of considerable strength and/or stiffness, able to bear and withstand loads.

The lattice structure 16 may be a periodic structure, with a configuration that repeats in directions parallel to the plates 12 and 14. In some embodiments, there may be portions of the lattice structure 16 that divert from the period structure in number, characteristics, or configuration of ribs 18.

The lattice structure 16 includes hard points 22. The hard points 22 are strengthened and/or stiffened points of the lattice 16, stronger and/or stiffer than adjoining portions of the lattice 16. The hard points 22 may be at the junction between the lattice structure 16 and the face plate 12, as shown in the illustrated embodiment.

The hard points 22 may be used for making connection to the sandwich structure 10. For example the hard points 22 may be used as nut plates integrally built into (and part of) the lattice structure 16. The hard points 22 may have integrally-formed internally-threaded holes in them for receiving fasteners or other suitable devices. With regard to threaded fasteners, the hard points 22 may have threaded holes, as is shown in the illustrated embodiment, or alternatively may have holes or recesses for receiving internally threaded inserts.

The hard points 22 may have any of a variety of shapes and thicknesses. For example the hard points 22 may have cylindrical and/or parallelepiped shapes, to give two non-limiting examples. The hard points 22 each may have a lateral extent (such as a diameter or length) that is greater than their height away from the adjoining face plate 12, for example.

The hard points 22 may also be at locations that are built up or reinforced with additional material, such as the protrusions 26, on an opposite side or major face of the plate 12 from where the hard points 22 are located.

The sandwich structure 10 may be made by an additive manufacturing process, as a single, unitary continuous piece. A suitable additive manufacturing method for making the sandwich structure 10 is laser powder bed fusion, in which laser energy is directed to selective portions of a powder bed to melt material that is then solidified, building up the sandwich structure 10 layer by layer. Other suitable additive manufacturing techniques may be employed, for example directed energy deposition using a laser with powder directed into the laser beam to build up material, or with extrusion and melting of a wire to build up material at desired locations. All of these methods may involve movement of some sort of energy source relative to a bed upon which the sandwich structure 10 is built.

The sandwich structure 10 may be made all of the same material, or may be made from multiple materials, with different material composition in different parts of the sandwich structure 10. Materials may include metallic materials and/or non-metallic materials. Non-limiting examples of suitable metallic materials include metallic elements such aluminum, titanium, and copper, and metallic alloys such as nickel-chromium alloys marketed under the trademark INCONEL, and iron-nickel alloys marked as INVAR and SUPER-INVAR. Non-limiting example nonmetals include ceramic materials, and low-dielectric polymers.

The face plates 12 and 14 may be flat, as is shown in the illustrated embodiment of FIG. 1. Alternatively the face plates 12 and 14 may be curved, or may have other non-flat configurations. In the illustrated embodiment the face plates 12 and 14 are shown as having uniform thickness, but alternatively there may be variations in thickness in one or both of the face plates 12 and 14, for example to increase strength and/or stiffness when additional load needs to be supported.

Similarly, there may be variations in the material composition, thickness, and/or other characteristics of the ribs 18. The ribs 18 may be stronger and/or stiffer in areas that receive more loading. The stronger and/or stiffer ribs of the ribs 18 may be thicker than other of the ribs 18. Alternatively or in addition some or all of the ribs 18 may be hollow. Hollow ribs have the advantage of lighter weight.

The sandwich structure 10 has many advantageous characteristics. It is a lightweight structure that includes the self-supporting hard points 22 that (in some embodiments) are used for mounting. The mounting may involve mounting the structure 10 to other objects, and/or may involve mounting other objects onto the sandwich structure 10. The sandwich structure 10 can have local reinforcement where needed and its manufacture requires no adhesive, joining, or wire electric discharge machining (EDM). If the sandwich structure 10 is all made of the same material it has isotropic properties, which gives it uniform growth or shrinkage from temperature changes. This is a significant advantage in situations where dimensional stability is important, such as for optical mirror supports or precision structures.

As noted above, the sandwich structure 10 may be optimized for stiffness and/or weight by having extra material in high-stress areas, and less material in low-stress areas. Also these benefits may be achieved by use of different materials in different parts of the structure.

The sandwich structure 10 may have reduced weight, reduced cost (in terms of analysis, manufacturing, touch labor, number of drawings, potential for scrap, additional steps such as heat treatments, and/or tooling required for complex shapes), reduced lead time, reduced part count, increased strength and/or stiffness, the ability to achieve configurations not achievable by prior manufacturing techniques, and/or isotropic properties that may lead to improved dimensional stability that is not possible with prior structures. Any combination of these advantageous may be achieved or achievable in any embodiment of the sandwich structure 10 described above.

The sandwich structure 10, or variations of such structure, may be employed for a wide variety of purposes. The sandwich structure may be used as structural support, or as a mounting, such as for optical components. Other possible uses are as a radiation shield (against radio frequency (RF) radiation), a thermal shield, or as part of a heat exchanger.

Figure 4:
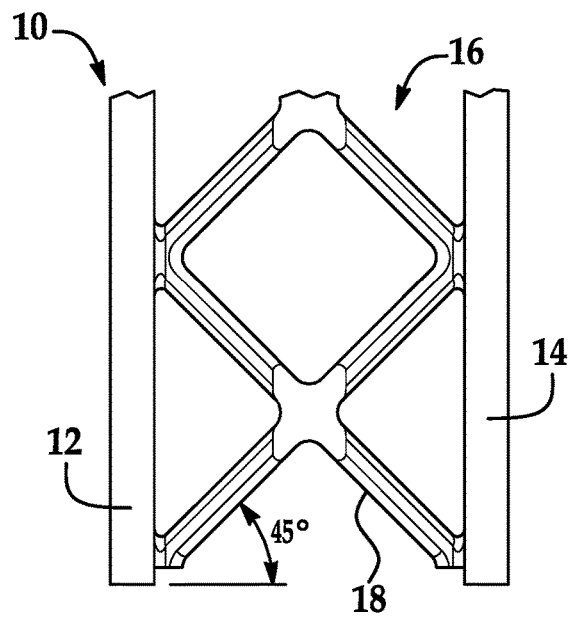
FIG. 4 is a magnified view showing part of the lattice structure of the sandwich structure of FIG. 1.
Figure 5:
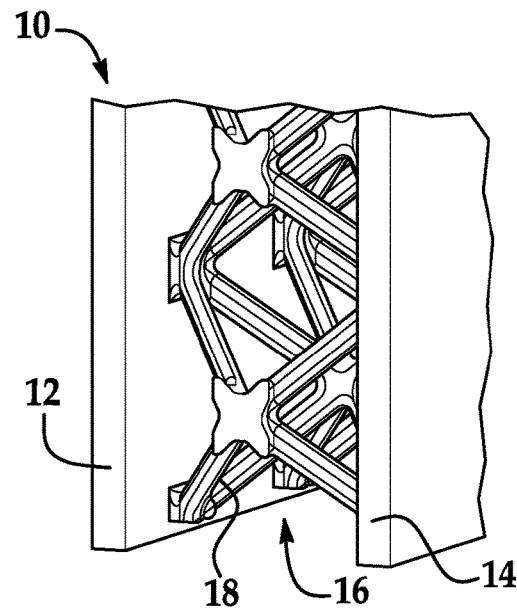
FIG. 5 is an oblique view of the part of the lattice structure of FIG. 4.

FIGS. 4 and 5 show another view of the configuration of the ribs or struts 18 in the lattice structure 16. The ribs 18 are in a pattern at angles of 45 degrees from the direction perpendicular to the major surfaces of the face plates 12 and 14, with the ribs 18 intersecting midway between the face plates 12 and 14. This is only one example of an arrangement of the lattice structure 16. Many other configurations are possible.

The parts of the sandwich structure 10 may have any of a variety of suitable dimensions. For example the ribs 18 may have diameters (or longest cross-sectional extents) of 1-2.5 mm (0.04-0.10 inches), to give non-limiting examples. The face sheets 12 and 14 may also have a thickness of 1-2.5 mm (0.04-0.10 inches), to give non-limiting examples. The structure 10 may have a length, width, and/or height of up to about 25 cm (10 inches), with the above thicknesses appropriate for structures of such size. It may be possible to have larger structures, for example with dimensions up to 81 cm (32 inches) or more, with correspondingly thicker face sheets 12 and 14, and/or ribs 18.

FIGS. 6-11 show various alternate embodiments, some of which were mentioned above. The features of these alternate embodiments may be combined with those of other embodiments (including the embodiment shown in FIGS. 1-5) in any combination. In the descriptions that follow many details are omitted, being the same as or similar to those discussed above.

Figure 6:
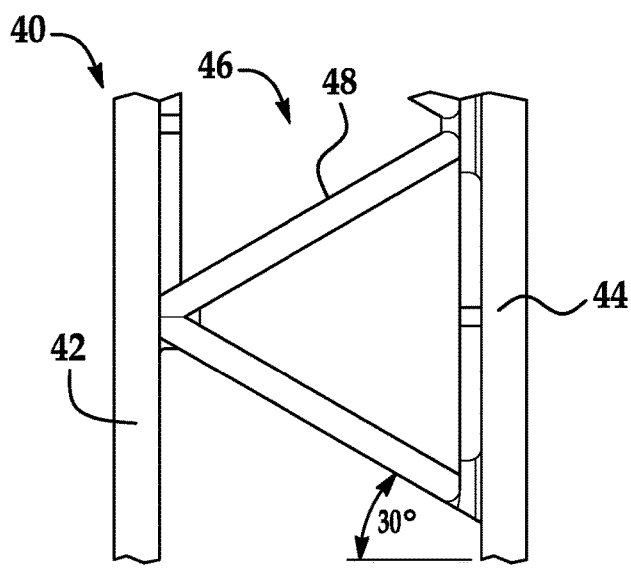
FIG. 6 is a magnified view showing part of a lattice structure of a sandwich structure according to an alternate embodiment of the invention.
Figure 7:
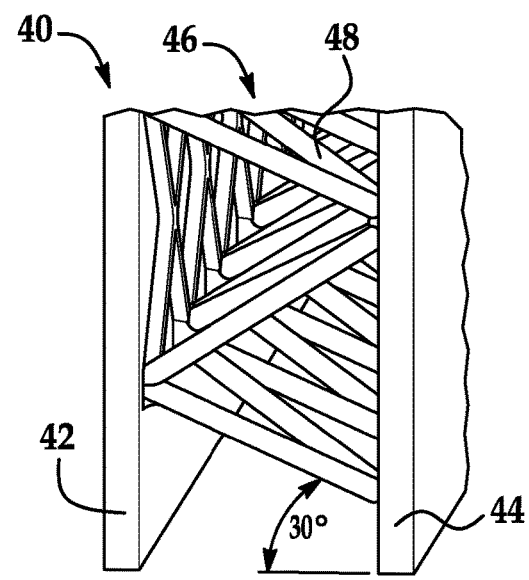
FIG. 7 is an oblique view of the part of the lattice structure of FIG. 6.

FIGS. 6 and 7 show an alternate arrangement of ribs or struts, with a sandwich structure 40 having a lattice structure 46 between face plates 42 and 44. Ribs or struts 48 of the lattice structure 46 are in a pyramidal pattern with the ribs 48 at an angle of 30 degrees from the direction perpendicular to the major surfaces of the face plates 42 and 44. The ribs 48 extend directly between the face plates 42 and 44.

The ribs 18 and 48 may have any of a variety of suitable cross-section shapes. For example the ribs 18 and 48 may be circular or elliptical.

Figure 8:
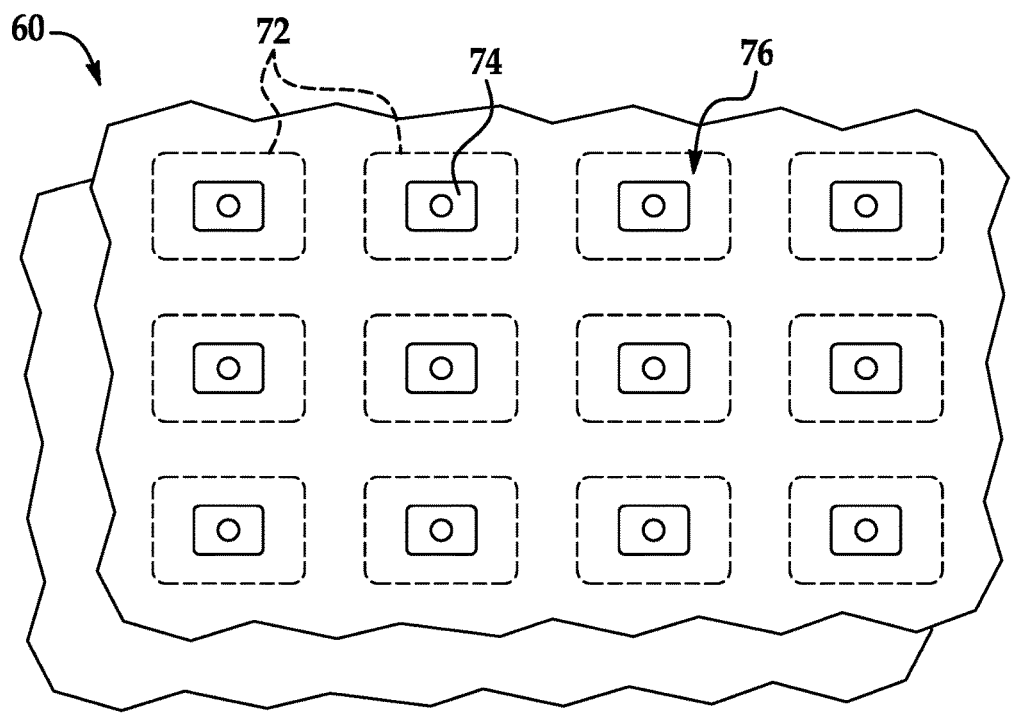
FIG. 8 is a view of a sandwich structure according to another alternate embodiment of the invention.

FIG. 8 shows another variant, a sandwich structure 60 which has hard points 72 that have a parallelepiped shape, with internally-threaded inserts 74 in recesses or holes 76 in the hard points 72. The inserts 74 allow the hard points 72 to receive threaded fasteners, with the hard points 72 functioning as nut plates.

Figure 9:
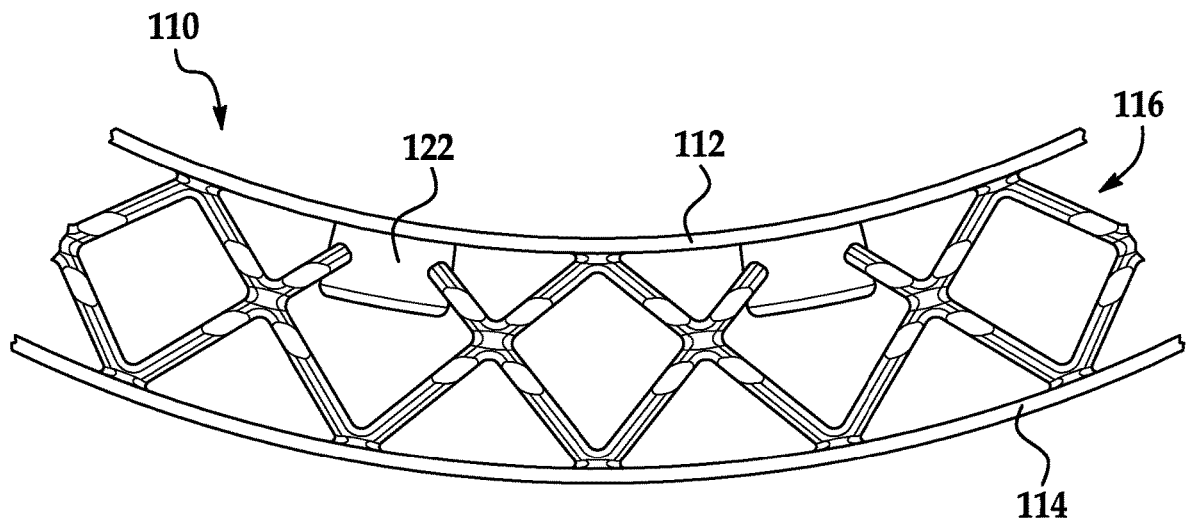
FIG. 9 is a side view of a sandwich structure according to yet another embodiment of the invention.

FIG. 9 shows a sandwich structure 110 which has curved face plates 112 and 114, between which is a lattice structure 116 with hard points 122. As illustrated by FIG. 9, the face plates of a sandwich structure may have a wide variety of suitable shapes, for example for conforming to an object or objects to which the sandwich structure is to be mechanically coupled.

Figure 10:
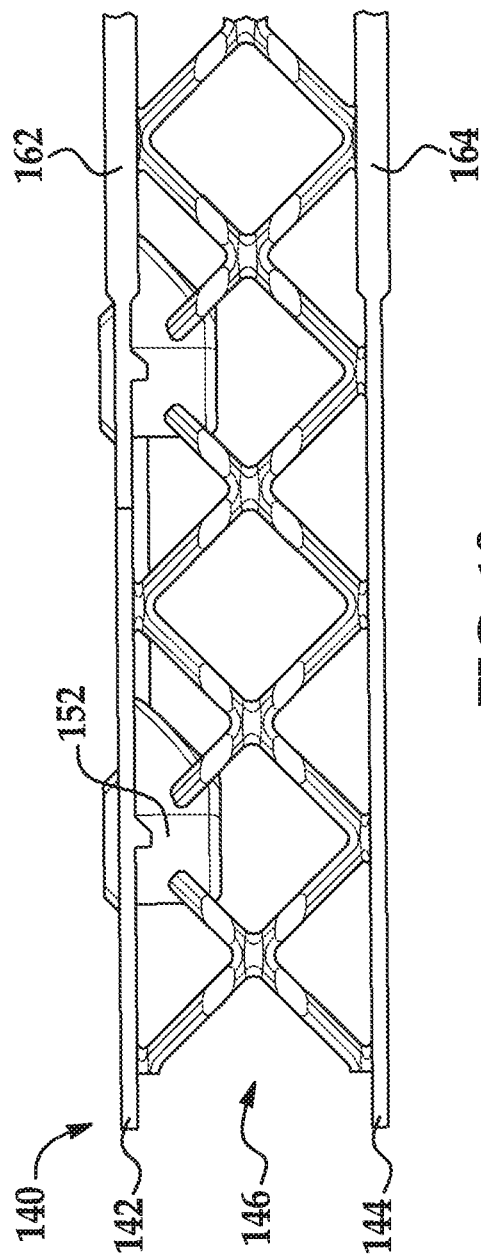
FIG. 10 is a side view of a sandwich structure according to still another embodiment of the invention.

FIG. 10 shows a further embodiment, a sandwich structure 140 which has a lattice structure 146 with hard points 152, between face plates 142 and 144. Unlike other embodiments, the face plates 142 and 144 have non-uniform thickness, for example being thicker in higher stress areas 162 and 164.

Figure 11:
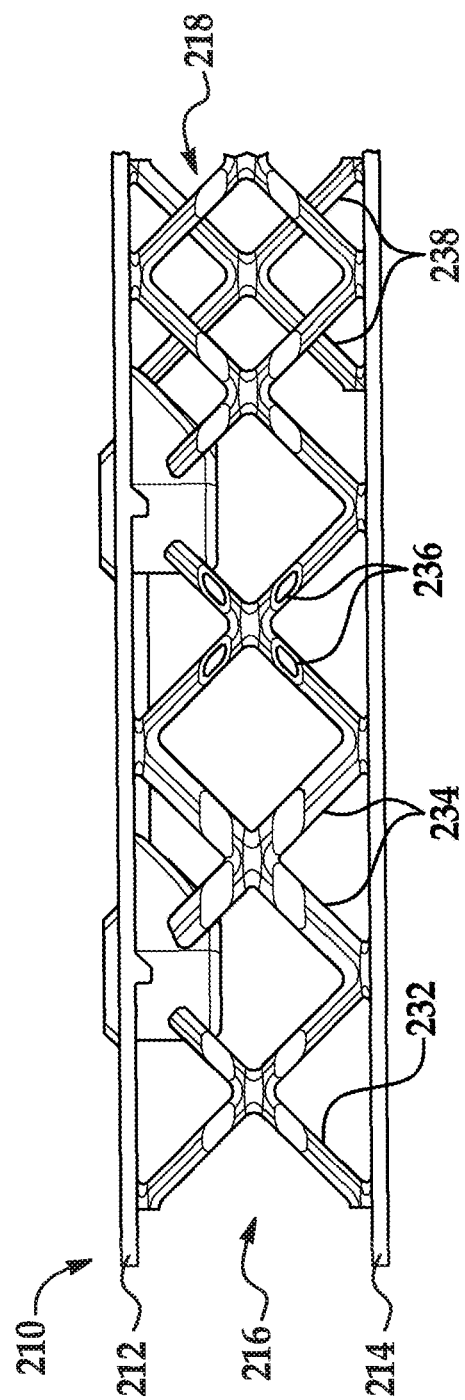
FIG. 11 is a side view of a sandwich structure according to a further embodiment of the invention.

FIG. 11 shows a sandwich structure 210 that illustrates several possible characteristics for making a lattice structure 216 more structurally robust in some local areas. Ribs 218 of the lattice structure 216 are between face plates 212 and 214. Parts of the lattice 216 are stronger/weaker than other parts in order to tailor parts of the lattice structure 216 for handling different expected loads.

The ribs 218 include, for example, a first set of ribs 232 that have a different composition, being made of different material than other of the ribs 218. The ribs 218 can also include a second set of ribs 234 that are thicker and thus stronger and/or stiffer than the first set of ribs 232. As another example, a third set of ribs 236 are hollow, and are not as strong (stiff) as other ribs 218, such as either the first or second sets of ribs 232, 234, but have the advantage of being lighter. Finally, an additional fourth set of ribs 238 is placed in a high-load area, providing additional strength and/or stiffness over that of the other parts of the lattice structure 216. It will be appreciated that these features may be combined in the same region, in any combination, if desired.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A sandwich structure comprising:
    a pair of face plates; and
    a lattice structure between the face plates;
    wherein the lattice structure includes anchor points that are stiffer than surrounding regions of the lattice structure;
    wherein the anchor points are located at junctions between the lattice structure and one of the face plates; and
    wherein the anchor points have integrally-formed internally threaded holes to receive threaded fasteners, to mechanically couple the sandwich structure to one or more other objects.

2. The sandwich structure of claim 1, wherein the lattice structure is additively manufactured as a unitary piece.

3. The sandwich structure of claim 2, wherein at least one of the face plates is also additively manufactured as part of the unitary piece that includes the lattice structure.

4. The sandwich structure of claim 1, wherein the lattice structure and at least one of the face plates are made of the same material.

5. The sandwich structure of claim 1, wherein the lattice structure includes ribs.

6. The sandwich structure of claim 5, wherein some of the ribs are stiffer than other of the ribs.

7. The sandwich structure of claim 5, wherein some of the ribs are made of different material(s) than other of the ribs.

8. The sandwich structure of claim 5, wherein some of the ribs are thicker than other of the ribs.

9. The sandwich structure of claim 1, wherein the lattice structure includes ribs, at least some of which are hollow ribs.

10. The sandwich structure of claim 1, wherein the lattice structure includes ribs angled at multiple non-perpendicular angles to major surfaces of the face plates.

11. A method of making a sandwich structure, the method comprising:
   manufacturing a lattice structure of the sandwich structure;
   wherein the lattice structure is between face plates of the sandwich structure; and
   wherein the lattice structure includes anchor points that are stiffer than surrounding regions of the lattice structure;
   wherein the anchor points are located at junctions between the lattice structure and one of the face plates; and
   wherein the anchor points have integrally-formed internally threaded holes to receive threaded fasteners, to mechanically couple the sandwich structure to one or more other objects.

12. The method of claim 11, wherein the manufacturing of the lattice structure is additive manufacturing.

13. A sandwich structure comprising:
   a pair of face plates; and
   a lattice structure between the face plates;
   wherein the lattice structure includes anchor points that are stiffer than surrounding regions of the lattice structure;
   wherein the anchor points are located at junctions between the lattice structure and one of the face plates;
   wherein the anchor points have integrally-formed internally threaded holes to receive threaded fasteners, to mechanically couple the sandwich structure to one or more other objects; and
   wherein the lattice structure includes ribs extending between the face plates.

14. The sandwich structure of claim 13, wherein the ribs intersect with the anchor points.

15. The sandwich structure of claim 1, wherein the anchor points are spread across the one of the face plates.

16. The sandwich structure of claim 15, wherein the anchor points are spread in a grid pattern across the one of the face plates.

* * * * *